Sept. 23, 1952  J. A. CRAIN  2,611,309
GRAPE VINEYARD CULTIVATOR
Filed Sept. 23, 1946  2 SHEETS—SHEET 1

Inventor
J. A. Crain
By Wilfred E. Lawson
Attorney

Sept. 23, 1952           J. A. CRAIN           2,611,309
GRAPE VINEYARD CULTIVATOR Filed Sept. 23, 1946           2 SHEETS—SHEET 2

Inventor
J. A. Crain
By Welfred Lawson
Attorney

Patented Sept. 23, 1952

2,611,309

UNITED STATES PATENT OFFICE 2,611,309

GRAPE VINEYARD CULTIVATOR

Joel A. Crain, Clovis, Calif.

Application September 23, 1946, Serial No. 698,854

2 Claims. (Cl. 97—137)

The present invention relates to a grape cultivating machine intended for attachment as a side car to a tractor by which it can be pulled over the ground for preparing the soil. In other words my invention is a row crop implement for tilling the soil, more particularly related to grape cultivation.

One embodiment of this invention is shown on the attached drawings and fully described in the subjoined description, by which the construction of the implement and its function will be readily understood.

In the drawings like numerals denote the same details in the different figures.

Figure 1:
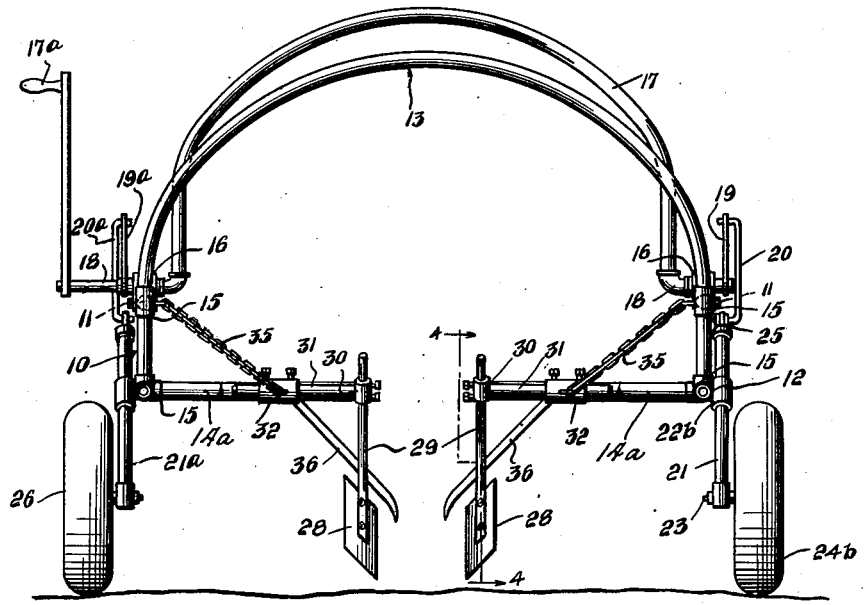
Figure 1 is a rear view of my grape cultivator machine.

Reference numeral 10 denotes in general a rigid cultivator structure, which comprises left and right rectangular side frames, formed by upper and lower rods 11 and 12, the ends of which are connected in a suitable manner as by welding or couplings 15 to arcuate transverse members 13 and 14, all of tubular rods, forming together a rigid main structure. Midway between the ends of each of the upper side rods 11 is fixed, as by bolts or other suitable means, a bearing bracket 16 in which is pivoted to oscillate, one of two shaft ends 18 of an operating lever 17, which lever is arcuate and reaches from the left to the right side of the main cultivator structure 10. The shaft ends 18 of said lever extend outwardly beyond said bearings 16 on both sides and the right one has fixed thereon a short arm 19 having link connection 20 with the upper end of one of two straight, two armed levers 21, pivoted in the middle as at 22 on the lower frame rod 12. At the lower end of the right lever 21 the wheel axle 23 is secured for carrying the ground wheel 24. There are two wheels 24, 24b on the outer or right side of the cultivator 10. The second wheel 24b, being arranged in tandem with the first wheel 24, but carried on the second two armed levers 21 on a second bearing 22b, is secured further back on the same frame rod 12. A long connecting rod 25 pivotally couples the two upper ends of the front and rear lever arms 21 so that both wheels 24 and 24b always rock in unison, when the operating lever 17 is turned from the full line position to the dotted line position indicated in Figures 1 and 2, the latter position indicating that wheels have lifted the cultivator out of the soil.

Similar to this wheel structure a third wheel 26 is carried on an arm 21a which is pivoted to the left lower rod 12 at 22a. This arm 21a is connected by a link 20a to the short outer arm 19a on the inner or left pivot end 18 of the lever 17. In order to aid in lifting or lowering the cultivator 10 on the three wheels 24, 24b and 26, a second lever 17a is provided on the left or tractor end 18 of the arcuate lever 17, so that all three wheels can be swung either by the middle lever 17 or the second lever 17a.

The main cultivating implements are two pointed shovels 28, each mounted on a rigid shaft 29 which is supported for slidable adjustment, up and down, in a sleeve 30 carried on a transverse stub axle 31 which is slidable in and out in a clamping sleeve 32. Said sleeve 32 forms a permanent fixture at the free end of a tubular arm 33 which is hinged for slight sideways motion by a universal hinge member 34 on the short front bar 14a and pointing rearwardly on the cultivator 10.

The clamping sleeve 32 has a yielding transverse support such as chain 35 for connecting the tubular arm with the adjacent side rod 11. On the lower side rod 12 is fastened one end of a flat spring strip 37, which abuts at its free end against the tubular arm 33 to hold said arm and the shovel 28, for yielding movement in lateral direction.

Lastly there is provided a pair of pointed pin-break members 36 with their pointed ends close to the shovels 28 around the front ends of which they are curved from their securing place on the tubular arms 33 on which they are bolted.

It will be noted that the pair of shovels 28 can be adjusted up and down to regulate depth of cut by shifting the shanks 29 in their sleeves 30 and securing them by set screws therein at desired height.

Likewise the shovels 28 may be set closer together or further apart as required, by shifting the stub axles 31 laterally in the sleeves 32.

Figure 3:
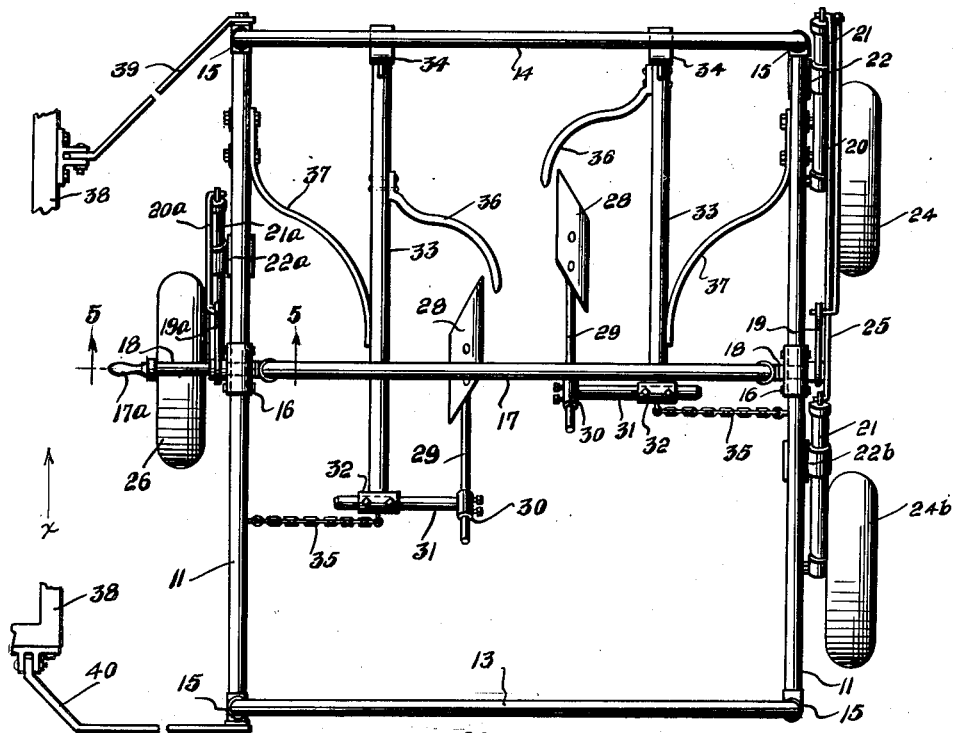
Figure 3 is a top plan view thereof.
Figure 4:
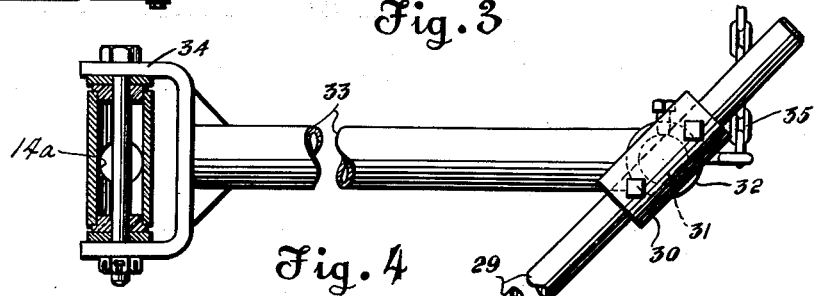
Figure 4 is a detail view on an enlarged scale taken on a plane along line 4—4 of Figure 1.
Figure 5:
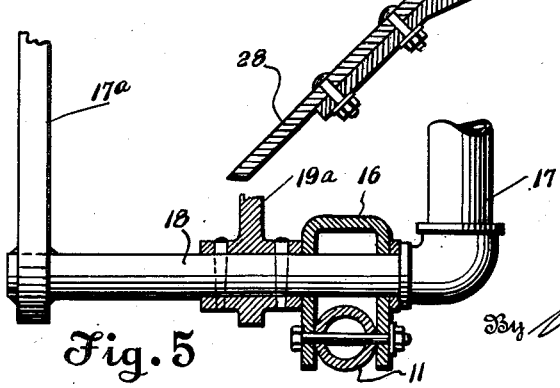
Figure 5 is a similar view taken along line 5—5 of Figure 3 and partly in section.

The cultivator 10 is held to the side of a tractor body 38 by means of a pair of braces 39, 40 hinged one at each end of the lower side rod 12; the other ends of these braces 39, 40 are hinged to a beam or fixed portion of the tractor body 38 so that the cultivator 10 always advances with the tractor in the direction of arrow X, Figure 3.

Figure 2:
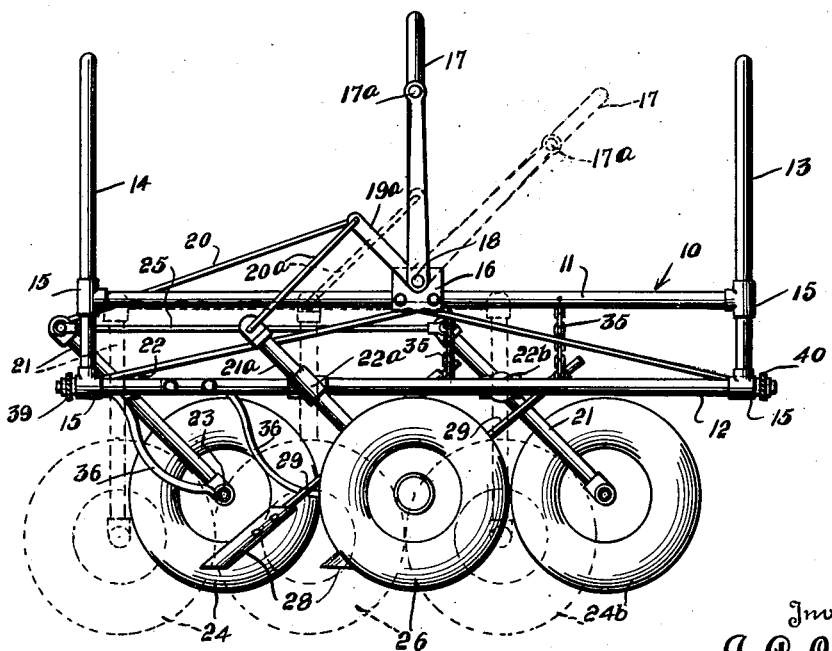
Figure 2 is a side elevation of Figure 1 as seen from the tractor side.

In operation the cultivator works as follows:

Supposing that the cultivator is attached to the tractor 38 as described and the cultivator wheels 24, 24b and 26 are in the dotted position, Figure 2, with the cultivator 10 and the shovels above the ground; by now throwing back the operating levers 17, and 17a the positions will then be as indicated by full lines and the cultivator 10 lowered so that the shovels 28 and the members 36 are ready to enter the soil.

It is to be understood that the invention as herein disclosed may be varied from the details described and shown without departure from the spirit of the subjoined claims.

I claim:

1. In a cultivator for grape vineyards and the like, a frame comprising pairs of oppositely disposed upper and lower side members, arched transverse end members connecting the front and rear ends of said side members, a pair of levers spacedly pivoted intermediate their ends to the lower side member at one side of said frame, another lever pivoted intermediate its ends to the lower side member at the opposite side of said frame, axles projecting laterally outward from the lower ends of said levers, ground wheels on said axles, a lever of arched form disposed transversely of said frame midway between the front and rear ends thereof, outwardly directed extensions at the opposite ends of said arched lever, bearings centered on the upper side members of said frame for said extensions, a hand lever mounted on the outer end of one of said extensions, an arm extending radially from each of said extensions, links connecting said arms with the upper ends of the first levers whereby the ground wheels can be raised and lowered upon the actuation of said hand lever, a pair of transversely aligned members extending inwardly from the front ends of the lower side members of said frame, a pair of elongated elements of different lengths extending rearwardly in parallel relation from said aligned members, ground working elements dependingly supported from the rear ends of said elongated elements, and draft coupling means offset from one side of said frame.

2. The cultivator as defined in claim 1, with the said elongated elements each hinged to the complemental of said transversely aligned members for lateral swinging movements, clamping sleeve carried at the rear ends of said elongated elements, an inwardly directed stub shaft supported in each of said sleeves, a shaft supported at one end from the inner end of each of said stub shafts and extending diagonally downward in a forward direction therefrom, said ground working elements being mounted on the lower end of the diagonally disposed shafts, flexible elements extending from the upper of the side members of said frame and connecting the free ends of said elongated elements to lend support thereto, and spring elements associated with each of said elongated members to allow limited lateral swinging movements thereto whenever the ground working elements meet with an obstruction in the paths of travel of the same.

JOEL A. CRAIN.

REFERENCES CITED

The following references are of record in the file of this patent:

UNITED STATES PATENTS

| Number | Name | Date |
| --- | --- | --- |
| 131,909 | Sherwood | Oct. 1, 1872 |
| 186,407 | Baker | Jan. 23, 1877 |
| 725,296 | Strehl | Apr. 14, 1903 |
| 902,107 | Osborne | Oct. 27, 1908 |
| 992,630 | Alkire | May 16, 1911 |
| 1,689,816 | Caulkins | Oct. 30, 1928 |
| 2,188,029 | Bateman | Jan. 23, 1940 |
| 2,320,742 | Newkirk | June 1, 1943 |
| 2,431,046 | Johnson | Nov. 18, 1947 |